UNITED STATES PATENT OFFICE.

RUNYON PYATT, JR., OF NEW YORK, N. Y., ASSIGNOR TO ROGERS & PYATT, OF SAME PLACE.

WATERPROOFING STRAW GOODS.

SPECIFICATION forming part of Letters Patent No. 403,697, dated May 21, 1889.

Application filed December 17, 1887. Serial No. 258,212. (Specimens.)

*To all whom it may concern:*

Be it known that I, RUNYON PYATT, Jr., of the city, county, and State of New York, have invented a new and useful Improvement in Waterproofing Straw Goods, of which the following is a full, clear, and exact description.

My invention relates to an improved process for waterproofing straw goods, and has for its object to carry out the same in a simple and expeditious manner, wherein the natural color of the goods will be preserved and a substantial body be imparted thereto, which is not susceptible of distortion or change of shape due to influences of dampness.

The invention consists in the process of waterproofing straw goods, as will be hereinafter fully set forth, and pointed out in the claim.

In carrying out the invention I first make a water-proof sizing consisting of the following ingredients, in substantially the proportions set forth, viz: button-lac, one hundred and forty pounds; sal-soda, fifty pounds; water, two hundred gallons.

In compounding the above ingredients I boil the button-lac and sal-soda, together with a suitable amount of water, in any proper vessel, and when thoroughly dissolved add water to the amount above specified. The solution obtained as above is now bleached to render it comparatively colorless, which is accomplished in the following manner: One hundred pounds of chloride of lime and one hundred gallons of water are mixed, and one hundred and ten pounds of sal-soda are separately dissolved in hot water, whereupon the soda is mixed with the chlorine water. Thirty gallons of this solution are then taken, and by process of thorough agitation commingled with the sizing solution, which imparts thereto a milky appearance.

If found desirable in the treatment of some grades of straw, shellac may be substituted for button-lac, the latter being also a product of stick-lac, but not so soft or flexible as the former.

The article to be waterproofed is submerged in the bleached sizing and allowed to remain therein a suitable length of time, determined by experience—for instance, from five to ten minutes. After the article has been withdrawn from the waterproofing-bath and thoroughly dried it is then subjected to a neutralizing-bath to restore the straw to the fresh bright color, and thus neutralize the darkening effect of the soda. For white goods I use an eight-per-cent. solution of oxalic acid. For other colors acetic, sulphuric, or an equivalent acid may be employed, the acetic acid being about a four-per-cent. solution and the sulphuric acid about one-half to one per cent. solution.

Having thus described my invention, what I claim as new, and desire to secure by Letters Patent, is—

The herein-described process of waterproofing straw goods, which consists in first subjecting the goods to a bath of resin dissolved in water and sal-soda, then drying said goods, and then neutralizing the effect of the alkaline solution by an acid bath, substantially as in the manner set forth.

RUNYON PYATT, JR.

Witnesses:
ANDREW B. ROGERS, Jr.,
HENRY F. BECK.